Figure 1:
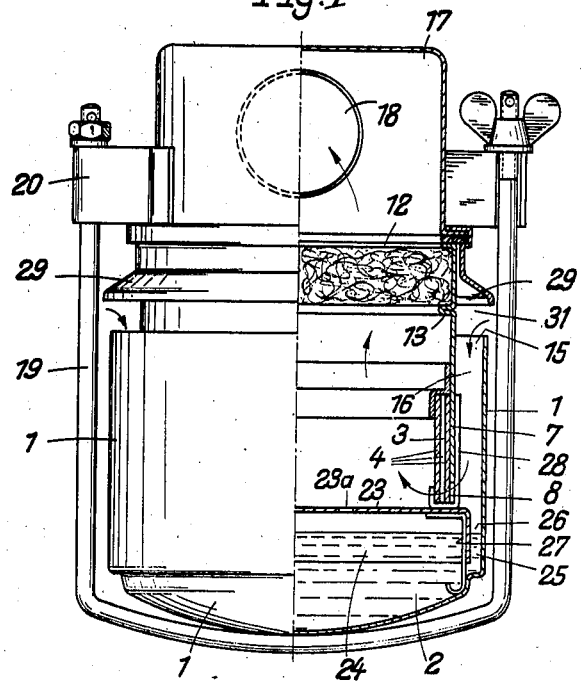

April 29, 1941.  W. NEUMANN  2,239,731
PURIFIER FOR GASES OR VAPORS
Filed July 7, 1937   2 Sheets-Sheet 1

Inventor:
W. Neumann
By John A. Seifert
Attorney

April 29, 1941.  W. NEUMANN  2,239,731
PURIFIER FOR GASES OR VAPORS
Filed July 7, 1937  2 Sheets-Sheet 2

Inventor:
W. Neumann
By John A. Seifert
Attorney

Patented Apr. 29, 1941

2,239,731

UNITED STATES PATENT OFFICE 2,239,731

PURIFIER FOR GASES OR VAPORS

Willy Neumann, Siedlung Ladeburg, near Bernau, Germany

Application July 7, 1937, Serial No. 152,350
In Switzerland August 10, 1936

5 Claims. (Cl. 183—15)

This invention relates to an apparatus for the filtering or purifying of air, gases or vapors by employing filtering layers moistened by a liquid, such as oil, and is suitable for use in connection with air-consuming machines, such as internal combustion engines, compressors and the like. Such machines have frequently to work in a very dusty atmosphere, especially when they are used in agricultural work, stone quarries, in road-making, and so forth. Furthermore, the apparatus according to the invention is suitable also for suction plants for dust from grinding and the like in which very dusty air is produced, which has to be filtered or purified so that it may be conveyed back again into the room.

As experience has shown, it is necessary, owing to the large amount of dust that is produced in such plants and operations, to employ a filter which automatically cleans itself, as otherwise the filter very quickly becomes choked with dust and loses its filtering action.

In the air filter or purifier according to the invention, the kinetic energy of the current of dusty air is utilized for the automatic cleaning of the filtering layer, in such a way that the air sets in strong undulatory movements a moistening liquid (primarily oil) situated below the dust separating filtering layer and serving for the automatic cleaning of this filtering layer, and thus produces a fine spray or mist of liquid. In this way a constant washing is effected of the filtering layer through which the air to be purified flows, and the filtering layer is thereby constantly washed, and, which is very important for the filtering or purifying action of the same, constantly remoistened. At the same time, by this undulatory motion and production of a fine spray or drizzle of the liquid a washing of the air to be purified takes place, whereby the efficiency of the filter is considerably increased.

Exhaustive experiments in practice and in the laboratory have shown that the air must flow through the filtering layer with a certain minimum velocity in order that such self-cleaning apparatus may work correctly. With too low an air velocity the undulatory motion of the moistening liquid is not strong enough to give a thorough washing of the filtering layer. It has been found by exhaustive experiments that the lower limit of this speed is about 3.5 metres per second. On the other hand, there is the risk, if the air speed is too high, of the moistening liquid being carried away or entrained by the flowing air. Means must be therefore provided, which will even with a very high air speed in the filter or purifier prevent an excessive and therefore harmful carrying away or entraining of liquid by the air.

According to the invention, the filtering insert of the filter or purifier consists of one or more filtering layers, arranged in series, which are partly so covered by a suitable means that the gap for the entrance of air into this filtering insert is of such dimensions, that the air speed in this gap is always greater than 3.5 meters per second. It is only from this speed onward that in accordance with the invention an undulatory motion of the moistening liquid sufficient for the automatic cleaning of the filtering layer can be obtained.

Also the height of the said gap, that is, the distance between the lower edge of the device partly covering the filtering layer and the surface of the moistening liquid, or between said lower edge of the device and the lower edge of the filtering layer, has a decisive influence on the satisfactory working of the purifier. If the height of this gap is too great, then even with very considerable air speeds the liquid cannot rise to the upper edge of the gap and the filtering layer. The part of the filtering layer that is thus not washed and is not subjected to the automatic cleaning then becomes clogged in course of time and thus narrows the air passage gap, so that owing to the higher resistance caused thereby, the air can not flow through the filter at the required rate.

According to a further feature of the invention the air inlet gap into the filtering layer is so proportioned by a suitable arrangement of the device that partly covers the filtering layer that its height is not greater than 35 mm.

A carrying away or entraining of the moistening liquid by the air to be filtered owing to too great a velocity of the air in the gap, can be prevented either by a suitable adjustment of the height of this gap, when the previously mentioned feature of the maximum size of the height of gap must certainly be taken into consideration. According to a further feature of the invention, the undesirable entraining away of liquid prevented by the space receiving the moistening liquid is being subdivided in such a way that only a small liquid surface, and thus only a small amount of liquid, is exposed to the air that sets this liquid in motion whereby even at very great and otherwise quite inadmissible air speeds an entraining, and thereby gradual emptying of the liquid container, is prevented with certainty.

Another feature of the invention consists in that a fine filtering cartridge is also arranged in succession to the main filtering layer before the exit of air from the filter, by which fine filter the air is freed from any particles of dust that may still be contained in it. At the same time, this second filtering layer can also act as a liquid separator, and in many cases make the arrangement of a special liquid separator superfluous, whereby a lower constructional height and a reduction of the resistance of the filter or purifier can be obtained.

Further features of the invention relate to special arrangements and constructions of the separate parts of the filter or purifier. For example the filtering layer of the main filter and also that of the fine filtering cartridge may consist of expanded metal. Furthermore, in order to avoid too great an air resistance, the fine filter may be given a very large passage cross section, which for instance is larger than the cross section of the filter casing.

The apparatus according to the invention is not limited to the filtering or purifying of air, but is suitable also for the treatment of other gases and vapors. Also, the invention is not limited to the examples of construction shown in the drawings and more particularly described in the specification.

Figure 2:
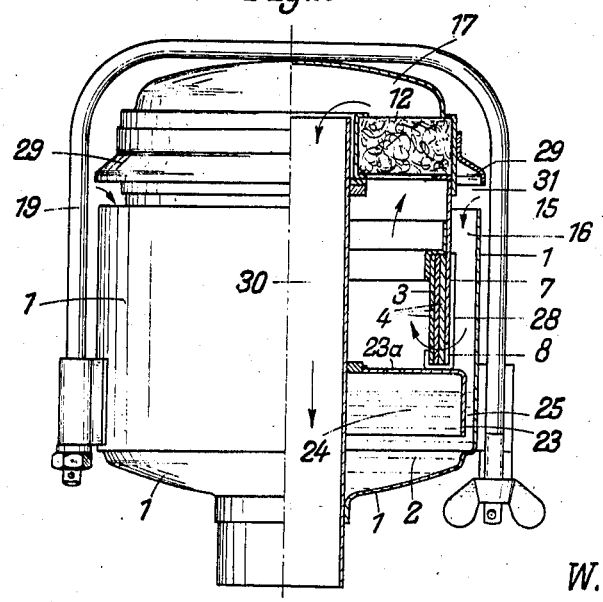
Figure 3:
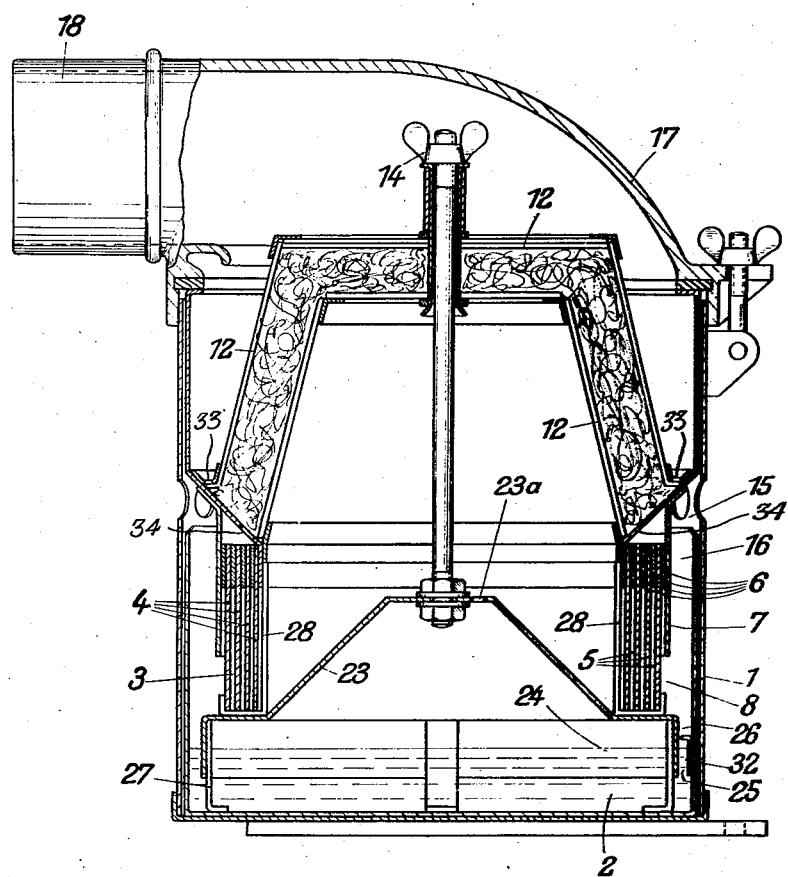

The invention is more particularly described with reference to the accompanying drawings which show different forms of construction by way of example and in which:

Figs. 1 and 2 show, partly in vertical section and partly in elevation two forms of construction and Fig. 3 is a vertical section of a still further embodiment of the invention.

In the embodiment of the invention shown in Figures 1 and 2 the cleaner consists of a casing 1 in the form of a cup member carrying liquid 2, such as oil, in the lower portion thereof.

In the construction of the cleaner shown in Figure 1 a bell 23 is engaged at the open end into the liquid 2 dividing the liquid space into two chambers 24 and 25. The diameter of the bell is less than the diameter of the casing and provides a relatively narrow annular gap 26 between the bell and the side wall of the casing. The bell 23 is mounted on supports or brackets 27 engaging the bottom of the casing 1. A cylindrical filtering element 3 is engaged upon the bell above the liquid in the casing and extends upwardly from the bell, said filtering element consisting of a series of metal grids or gratings 4 of expanded metal, or other material suitable for separating foreign substances from the air or other gaseous medium to be cleaned, the grids being arranged concentrically of each other and preferably spaced radially a predetermined distance from each other, as indicated at 5 in Figure 3, by spacing blocks 6 to which the grids or layers 4 may be fastened. The filtering element is partly covered or enclosed by a guide plate in the form of a cylindrical member or sleeve 7 lying contiguous to the outer grid of the filtering element. The guide plate or sleeve 7 is of a length to extend upwardly above the filtering element and out of the casing 1 and extends to within the lower end of the filtering element providing a gap or inlet 8 for the passage of air to be cleaned into and through the filtering element between the lower edge of the guide plate and the top of the bell and surface of the liquid in the gap 26. The grids 4 of the filtering element 3 are held in assembled relation by an annular member having a portion of right angle form in cross section with a part thereof engaging over the upper ends of the grids and a portion engaging within the upper portion of the inner grid, and said member having a portion lying contiguous to the inner surface of the guide plate or sleeve 7 above the filtering element and attached thereto, as clearly shown in Figures 1 and 2. The lower ends of the grids of the filtering element are held assembled by yoke members 28 engaging about the lower ends of the grids and having a portion lying contiguous and secured to the outer surface of the guide plate or sleeve 7.

A second final filtering element or cartridge 12 is engaged in the upper end of the guide plate 7 and rests therein upon a shoulder extended inwardly from said plate, and shown as formed by an inwardly pressed portion of the guide plate, as at 13. The filtering element 12 may also consist of a series of grids or layers of expanded metal or other suitable material. The grids of the filtering element 12 are held together seated on the shoulder 13 by a laterally extending portion of a hood 17 engaging upon the upper end of the guide plate or sleeve 7 and the marginal portion of the filtering element with a packing material interposed between the same, and said hood flange and packing engaging in a portion of channel shape in cross section at the end of an annular member 29 having an intermediate portion lying contiguous to the outer surface of the guide plate or sleeve 7, the lower end of said member 29 terminating in spaced relation to the upper end of the casing and arranged to overhang the upper end of the casing and form an inlet 31 for the air or other gaseous media to be cleaned to the inlet 15 to the passage 16 leading downward between the side wall of the casing of the guide plate and filtering element 3 to the surface of the liquid in the gap 26. The hood 17 is provided with an opening 18 to constitute the outlet of the air cleaner.

The bell, filtering elements 3 and 12, the guide plate or sleeve 7 and the hood 17 are retained in assembled relation in the casing 1 by a U shaped or yoke member 19 engaged about the bottom of the casing and the one leg extended through an opening in a lug 20 fixed to and extending laterally from the hood and a nut with an interposed washer threaded onto the outer end thereof, as shown at the left in Figure 1. The opposite leg of the yoke member engages sidewise in and extends through a recess arranged in a side and extending transversely of a lug fixed to and extending from the hood diametrically opposite the lug 20 with a wing nut threaded onto the outer end of said leg, as shown at the right in Figure 1. By threading the nuts onto the legs of the yoke member the leg connecting portion will be drawn to and yieldingly engage the bottom of the casing firmly holding the parts assembled. By engaging the one leg with the wing nut in the recess in the side of the lug the cleaner may be readily disassembled, as it only requires the loosening of the wing nut and then swinging the yoke member outwardly away from the casing.

The filtering element 12, the guide plate or sleeve 7, the filtering element 3 and bell 23 form a chamber at the rear of the filtering element 3 in communication with the bell 23 through a perforation or perforations 23ª in the bottom thereof. By this arrangement the cleaner as it is shaken in the use of the same in a motor vehicle the liquid will pass through said perforations into said chamber and be thrown or splashed onto the filtering element 12 and moisten the same.

In the embodiment of the invention shown in Figure 2, there is utilized the casing 1, the bell 23 provided with the perforations 23ª, the filtering element 3, the guide plate or sleeve 7 to which the filtering element 3 is connected, the secondary or fine filtering element 12, the hood 17 and the annular member 29 having the lower outwardly flared portion to overhang the entrance 31 to the inlet 15 to the passage 16. However, in said arrangement the outlet of the cleaner instead of being through the wall of the hood 17 is through a pipe or conduit 30 extended through the bottom of the casing 1 and the opposite end extended through an opening in the filtering element 12 and opening to the hood 17 at the outer side of the filtering element. Also to retain the cleaner parts assembled the end wall of the hood 17 is made of convex form and the leg connecting portion of the uniting yoke member 19 engages the hood and the lugs engaged by the legs of the yoke member are arranged on and extend laterally from the casing 1.

In the operation of the air cleaner shown in Figures 1 and 2 the air to be cleaned and filtered enters the filter through the annular gap 31. It is deflected by the guide plate or sleeve toward and into the inlet 15 of and downwardly through the passage 16 formed between the side wall of the casing 1 and the filtering element and guide plate 7. The air passing downwardly in the passage 16 impinges against the liquid in the gap 26 setting up an undulating movement and a whipping action of the liquid and thereby separating foreign substances from the air by the liquid and causing the liquid to be splashed in a spray onto the filtering element 3 not only moistening said filtering element but flushing or washing therefrom foreign substances that may have been separated from the air in its passage into the filtering element and accumulated thereon. By arranging the filtering element 3 with the restricted inlet 8 the air will be caused to flow at a high velocity into and through the filtering element 3, the filtering element separating from the air liquid and foreign substances that may be entrained with the air. The air passes through the filtering element 3 into the chamber at the rear side thereof and flows therefrom through the filtering element or cartridge 12 which separates from the air any liquid that may be entrained therewith. By enclosing or covering the greater portion of the filtering element by the guide plate or sleeve 7 and providing only a small gap 26 in which the liquid is exposed to the incoming air a relatively small quantity of the liquid is entrained with the air, and as the liquid in the bell does not come in direct contact with the air stream the entrainment or drawing off of liquid from the space 26 is positively avoided should the air flow at a very high velocity into and through the cleaner. By suitably dimensioning the gap 26 it is possible to expose only so much liquid for the incoming air to impinge against as will set up such an agitation and splashing of the liquid as will effect only a desired moistening and flushing from the filtering element 3 foreign substances which may have accumulated thereon. The cleaned and filtered air after passing through the filtering element or cartridge 12 in the Figure 1 arrangement passes through the outlet 18 in the hood 17, and in the Figure 2 arrangement passes from the hood out through the pipe or conduit 30.

Practice has shown that by separating the moistening liquid into a part, as 24, which is not exposed to the air, and a part, as at 25, exposed to the air, it is possible to use air speeds in the filter or cleaner above the level of the moistening liquid flowing at such high velocities that heretofore could not be approached without such an entrainment of the liquid from the container as would empty the container in a short time. Owing to the high air speeds now specified, the air filter or cleaner can be made comparatively small in dimension whereby its weight is reduced and there is a consequent reduction in the cost thereof. The bell 23 dividing the liquid has the further advantage that it prevents the upward and downward slopping of a large volume of liquid which is not required in the operation of the cleaner.

A filter or cleaner as of Figures 1 and 2 has the further advantage that the bell 23, the filtering element 3, the guide plate or sleeve 7, the fine filter 12 and the hood 17 form a unitary structure, so that the filter or cleaner consists only of two parts, namely, the casing 1 and the insert consisting of the above mentioned parts, which can be removed as a unit from the casing so that the cleaning of the filtering layers 4 and 12 is simplified.

In order to reduce the resistance of the fine air filter 12 to the flow of the air therethrough, the filter 12, as shown in Figure 3, may be in the form of a hood to constitute a part of the side wall of the chamber at the rear of the filtering element 3, so that the filtering element or cartridge 12 offers a considerably greater surface area for the passage of the air therethrough. In this form of air cleaner the air to be cleaned also enters through the inlet 15 into the cleaner, which inlet is in the form of openings spaced about the side wall of a shell or casing 1 in which the filtering elements are arranged. The air flows from the inlet 15 down through the passage 16 between the wall of the casing and guide plate, impinges on the liquid in the gap 26 and then passes through the gap 8 into the filtering element 3 in the manner set forth in connection with Figures 1 and 2 and exits from the cleaner through the outlet 18, which is provided in the hood 17 arranged above the casing 1. To moisten the cartridge 12 the bottom of the bell, which is arranged of truncated conical form, is also provided with the openings 23ª through which the liquid within the bell is adapted to pass and splash onto the filtering element 12 by the movement of the cleaner when in use in connection with an engine in a motor vehicle. Perforations 33 and 34 are spaced about the periphery of the supporting means for the cartridge 12 through which moistening liquid which has reached the cartridge 12 flows back into the filtering element 3 situated below the same. By this arrangement there is effected an additional moistening of the filtering element 3 and furthermore such return flow of the liquid is outside the path of flow of the air stream entering the cleaner, and is thus effected more easily.

For the purpose of observing the liquid level in the container, a liquid indicator 32 may be provided, as shown in Figure 3.

As stated, the members of the filtering element 3 may consist of a series of grids or expanded metal plates 4 spaced from each other so as to effect a flushing or washing of both sides by the moistening liquid. However, the separate grids or plates 4 may lie contiguous to each other, and only a single grid may be used. While the grids of the filtering elements preferably consist of expanded metal, they may consist of other suitable material, such as, for example, "raschig" rings, which are particularly suitable for the fine filtering element or cartridge 12.

I claim as my invention:

1. In a filter for air and other gases, a cup like member constituting a liquid carrying reservoir, a bell of less diameter and depth than the cup member supported in inverted position in the cup member with the open end engaged in the liquid therein and dividing the cup member into two concentric chambers with the liquid in the outer chamber exposed to the cup member and the outer chamber in communication with the inner chamber below the level of the liquid, a cylindrical filtering element of less diameter than the cup member engaged at one end upon and extending upwardly from the bottom of the bell, a sleeve engaged upon and in contiguous covering relation to the filtering element extending to adjacent the lower end thereof and the uncovered portion of the filtering element constituting a restricted inlet into the filtering element for the air to be filtered, said sleeve and filtering element defining with the side wall of the cup member an air inlet passage leading into the top of the cup member and open to the surface of the liquid in the outer chamber, and the air flowing through said passage adapted to impinge upon and set up undulating movement and splashing of said liquid to effect separation of foreign substances from the air and flush the inlet portion of the filtering element opening to said passage, a hood mounted on the sleeve adapted for connection of means to induce a flow of air into and through the inlet passage and filtering element, and a second filtering element supported at the upper end of the sleeve between the hood and sleeve and forming with said sleeve and the first filtering element a chamber at the rear of the first filtering element above the bell for the passage therethrough of air passing through the first filtering element to the second filtering element.

2. In a filter for air and other gases, a cup like member constituting a liquid carrying reservoir, a bell of less diameter and depth than the cup member supported in inverted position in the cup member with the open end engaged in the liquid therein and dividing the cup member into two concentric chambers in communication with each other below the level of the liquid and the bottom of the bell disposed above the level of the liquid and having openings therein, a cylindrical filtering element of less diameter than the cup member supported at one end upon the bottom of the cup member out of engagement with the liquid in the outer chamber, a sleeve engaged upon and in contiguous covering relation to the filtering element extending to adjacent the lower end thereof and the uncovered portion of said filtering element constituting a restricted inlet into the filtering element for the air to be filtered, said sleeve and filtering element defining with the side wall of the cup member an air inlet passage leading into the top of the cup member and open to the surface of the liquid in the outer chamber, and the air flowing through said passage adapted to impinge upon and set up undulating movement and splashing of said liquid to effect separation of foreign substances from the air and flush the inlet portion of the filtering element opening to said passage, a hood mounted on the sleeve adapted for connection of means to induce a flow of air into and through the inlet passage and filtering element, and a second filtering element consisting of juxtaposed plates of foraminous material supported at the end of the sleeve.

3. In a filter for air and other gases, a cup like member constituting a liquid carrying reservoir, a bell of less diameter and depth than the cup member supported in inverted position in the cup member with the open end engaged in the liquid therein and dividing the cup member into two concentric chambers with the liquid in the outer chamber exposed to the cup member and the outer chamber in communication with the inner chamber below the level of the liquid, a cylindrical filtering element of less diameter than the cup member engaged at one end upon and extending upwardly from the bottom of the bell, a sleeve engaged upon and in contiguous covering relation to the filtering element extending to adjacent the lower end thereof and the uncovered portion of the filtering element constituting a restricted inlet into the filtering element for the air to be filtered, said sleeve and filtering element defining with the side wall of the cup member an air inlet passage leading into the top of the cup member and open to the surface of the liquid in the outer chamber, and the air flowing through said passage adapted to impinge upon and set up undulating movement and splashing of said liquid to effect separation of foreign substances from the air and flush the inlet portion of the filtering element opening to said passage, a hood mounted on the sleeve adapted for connection of means to induce a flow of air into and through the inlet passage and filtering element, and a second filtering element of bell form supported at the open end by the sleeve and separating the portion within the first filtering element and sleeve from the hood.

4. In a filter for air and other gases, a cup like member constituting a liquid carrying reservoir, a bell of less diameter and depth than the cup member supported in inverted position in the cup member with the open end engaged in the liquid therein and dividing the cup member into two concentric chambers with the liquid in the outer chamber exposed to the cup member and the outer chamber in communication with the inner chamber below the level of the liquid, a cylindrical filtering element of less diameter than the cup member engaged at one end upon and extending upwardly from the bottom of the bell, a sleeve engaged upon and in contiguous covering relation to the filtering element extending to adjacent the lower end thereof and the uncovered portion of the filtering element constituting a restricted inlet into the filtering element for the air to be filtered, said sleeve and filtering element defining with the side wall of the cup member an air inlet passage leading into the top of the cup member and open to the surface of the liquid in the outer chamber, and the air flowing through said passage adapted to impinge upon and set up undulating movement and splashing of said liquid to effect separation of foreign substances from the air and flush the inlet portion of the filtering element opening to said passage, a hood mounted on the sleeve adapted for connection of means to induce a flow of air into and through the inlet passage and filtering element, and a second filtering element separating the space within the sleeve and first filtering element above the bell from the hood, and the bottom of the bell within the first filtering element being arranged of truncated conical form and provided with openings for the passage of liquid from within the bell and spraying the same onto the filtering elements by movement of the filter.

5. In a filter for air and other gases, a cup like member constituting a liquid carrying reservoir, a bell of less diameter and depth than the cup member supported in inverted position in the cup member with the open end engaged in the liquid therein and dividing the cup member into two concentric chambers with the liquid in the outer chamber exposed to the cup member and the outer chamber in communication with the inner chamber below the level of the liquid, a cylindrical filtering element of less diameter than the cup member engaged at one end upon and extending upwardly from the bottom of the bell, a sleeve engaged upon and in contiguous covering relation to the filtering element extending to adjacent the lower end thereof and the uncovered portion of the filtering element constituting a restricted inlet into the filtering element for the air to be filtered, said sleeve and filtering element defining with the side wall of the cup member an air inlet passage leading into the top of the cup member and open to the surface of the liquid in the outer chamber, and the air flowing through said passage adapted to impinge upon and set up undulating movement and splashing of said liquid to effect separation of foreign substances from the air and flush the inlet portion of the filtering element opening to said passage, a hood mounted on the sleeve adapted for connection of means to induce a flow of air into and through the inlet passage and filtering element, and a second filtering element carried at the upper end of the sleeve separating the space within the sleeve and the first filtering element above the bell from the hood, and said first filtering element attached to the sleeve whereby said sleeve is removable with the filtering elements as a unit from the casing.

WILLY NEUMANN.